Patented Jan. 6, 1948

2,433,866

UNITED STATES PATENT OFFICE 2,433,866

METHOD OF MAKING FURFURYL ACRYLATE

Chessie E. Rehberg, Philadelphia, and Charles H. Fisher, Abington, Pa., assignors to the United States of America, as represented by the Secretary of Agriculture No Drawing. Application December 27, 1943, Serial No. 515,798

2 Claims. (Cl. 260—345)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to furfuryl acrylate, a new composition of matter.

An object of this invention is to provide a new polymerizable composition of matter together with processes for its preparation and polymerization.

Other objects will appear from the following description.

We have found that furfuryl acrylate, which may be prepared by an alcoholysis reaction of methyl acrylate with furfuryl alcohol, is a valuable polymerizable compound.

The alcoholysis reaction is suitably carried out by heating furfuryl alcohol with an excess of methyl acrylate in the presence of an ester interchange catalyst and a polymerization inhibitor, removing the methanol formed by distillation of its azeotrope with methyl acrylate, and then recovering the furfuryl acrylate by fractional distillation. Aluminum alcoholates, such as aluminum tertiary-butoxide, are effective catalysts for the reaction, and the alcoholates of other metals, such as sodium and potassium, also give good results. Aromatic amines and phenols are examples of convenient polymerization inhibitors. This method of preparing furfuryl acrylates is illustrated by the following example:

Example I 98 parts (by weight) of furfuryl alcohol, 258 parts of methyl acrylate, 10 parts of para-phenylenediamine and 5 parts of powdered aluminum tertiary-butoxide were mixed and heated on a water bath until solution was complete. The solution was then heated on an oil bath for approximately 10 hours at a temperature of approximately 120° C., under a fractionating column fitted with a condenser arranged for controlling reflux. The distillate was collected at such a rate that the temperature of the vapor at the head of the column remained at or near the boiling point of the methanol-methyl acrylate binary azeotrope (62° C.). When the production of methanol had practically ceased, the excess methyl acrylate was distilled out of the mixture and the furfuryl acrylate was distilled under reduced pressure. Purified furfuryl acrylate has a boiling point of 93° C. at 16 mm. and at 20° C. it has a density of 1.1125 g. per cc. and a refractive index for the D line of sodium of 1.4800. The yield was 131 parts, or 86 percent of the theoretical.

The procedure outlined in Example I can be advantageously modified by removing methanol from the reaction mixture as an azeotrope with an aliphatic hydrocarbon of suitable boiling range, rather than as an azeotrope with methyl acrylate. This is the subject of a copending application for patent by Chessie E. Rehberg, Serial No. 515,799, filed December 27, 1943, now Patent Number 2,406,561, issued August 27, 1946. Also, furfuryl acrylate may be prepared by other methods. Any suitable esterification or ester interchange process may be used.

Monomeric furfuryl acrylate is a colorless, mobile liquid which may be polymerized with heat, light, and/or catalysts. Characteristically, a catalyst such as a peroxide, an ozonide, oxygen or ozone is employed. The polymerization may be effected in the presence or absence of a solvent or diluent, or the monomer may be emulsified and then polymerized. Preferably, polymerization is carried out at moderate temperatures, that is, about 50° to 100° C.

Furfuryl acrylate may also be copolymerized with a variety of other polymerizable compounds, such as other esters of acrylic or methacrylic acid. Since furfuryl acrylate has a multiplicity of polymerizable double bonds in its molecule, it is capable of forming cross-linked polymers and copolymers. If desired, so-called polymerization regulators, such as polychloro hydrocarbons and mercaptans, may be added to the monomer to aid in preventing or controlling cross-linkage.

Relatively small proportions of furfuryl acrylate in other polymerizable monomers such as the alkyl acrylates and methacrylates, produce appreciable alterations in the properties of the polymers formed. Thus, 5 percent or less of furfuryl acrylate, when copolymerized with methyl acrylate, produces a polymer which is relatively insoluble in the common organic solvents and which is appreciably harder and tougher than the polymer of methyl acrylate.

The polymerization of furfuryl acrylate is illustrated by the following examples:

Example II 19 volumes of methyl acrylate and 1 volume of furfuryl acrylate were dissolved in 80 volumes of ethyl acetate. 0.25 volumes of benzoyl peroxide was then added and the solution was placed on a water bath which was maintained at 70° C. After 24 hours the entire solution had set to a stiff, colorless, transparent gel which was relatively insoluble in the common organic solvents. After the ethyl acetate had been allowed to evaporate, the polymer was obtained as a tough, elastic, transparent solid which was harder, tougher and less soluble than methyl acrylate polymers.

*Example III*

A copolymer of furfuryl and methyl acrylates was prepared as in Example II, except that to the monomer solution there was added 0.1 volume of dodecyl mercaptan. The polymer thus obtained did not gel the ethyl acetate solution, forming instead a viscous, sirupy true solution. A film prepared from this solution by evaporation of the solvent was clear, colorless, flexible and elastic.

The properties of the polymers obtained by polymerization of furfuryl acrylate, with or without other monomers, can be controlled over a wide range of hardness, solubility, fusibility, elasticity, and so forth, by variation of the polymerizing process, addition of other monomers, solvents, fillers, dyes, plasticizers and other modifications of the process which are well known to those skilled in the art.

The polymers of furfuryl acrylate, and especially its copolymers with other polymerizable compounds, are valuable for moldings, extrusions, coatings, and the like. The peculiar type and degree of unsaturation in the furfuryl radical makes this acrylate particularly valuable for copolymerization with other monomers. Under certain polymerizing conditions, as for instance in Example II, cross-linkage may be obtained in the polymer in a degree which is controllable within wide limits. Under other conditions, as illustrated by Example III, the cross-linkage may be partially or entirely prevented. The polymer thus obtained probably contains the furfuryl radical intact and hence is unsaturated. This linear, unsaturated polymer may be vulcanized with sulfur or other known vulcanizing agents to produce an elastic, rubber-like product. Such vulcanization, and the incident curing, milling, and so forth, may be carried out with the agents, equipment and procedures used in similar operations on natural rubber.

Polymers of the type formed by furfuryl acrylate might also be formed with the substituted furfuryl acrylates. For example, alkyl furfuryl acrylates, dialkyl furfuryl acrylates, and halogen-substituted furfuryl acrylates contain the same pattern of unsaturation as is found in furfuryl acrylate, and they would accordingly be expected to polymerize and copolymerize to form resins of the same general type.

Having thus described our invention, we claim:

1. The process of preparing furfuryl acrylate which comprises heating methyl acrylate and furfuryl alcohol in the presence of a catalytic amount of aluminum tertiary-butoxide and a polymerization inhibitor.

2. The process of preparing furfuryl acrylate which comprises heating furfuryl alcohol and an excess of methyl acrylate in the presence of a catalytic amount of aluminum tertiary-butoxide to form the furfuryl acrylate and in the presence of a polymerization inhibitor, distilling the methanol produced by the reaction and the excess methyl acrylate out of the reaction mixture, and then recovering the furfuryl acrylate from the residue.

CHESSIE E. REHBERG.
CHARLES H. FISHER.

REFERENCES CITED

The following references are of record in the file of this patent:

UNITED STATES PATENTS

| Number | Name | Date |
|---|---|---|
| 2,109,877 | Barrett | Mar. 1, 1938 |
| 2,129,667 | Barrett | Sept. 13, 1938 |
| 2,281,613 | Wolthan | May 5, 1942 |
| 2,319,576 | Agnes | May 18, 1943 |
| 2,332,461 | Muskat | Oct. 19, 1943 |